(12) United States Patent
Omi

(10) Patent No.: US 7,761,731 B2
(45) Date of Patent: Jul. 20, 2010

(54) INFORMATION PROCESSING APPARATUS AND INFORMATION PROCESSING METHOD

(75) Inventor: Hiromi Omi, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 444 days.

(21) Appl. No.: 11/738,261

(22) Filed: Apr. 20, 2007

(65) Prior Publication Data

US 2007/0260941 A1 Nov. 8, 2007

(30) Foreign Application Priority Data

Apr. 25, 2006 (JP) .............................. 2006-120807

(51) Int. Cl.
*G06F 11/00* (2006.01)
(52) U.S. Cl. .................. 714/2; 714/47; 714/57
(58) Field of Classification Search ............. 714/2, 714/47, 57
See application file for complete search history.

(56) References Cited

U.S. PATENT DOCUMENTS

| | | | | |
|---|---|---|---|---|
| 3,979,557 A | * | 9/1976 | Schulman et al. | 704/207 |
| 5,444,859 A | * | 8/1995 | Baker et al. | 714/20 |
| 5,787,455 A | * | 7/1998 | Seybold | 711/100 |
| 5,790,558 A | * | 8/1998 | Nakamura | 714/704 |
| 5,960,447 A | * | 9/1999 | Holt et al. | 715/201 |
| 6,119,248 A | * | 9/2000 | Merkin | 714/52 |
| 6,513,005 B1 | * | 1/2003 | Qin et al. | 704/254 |
| 6,718,490 B1 | | 4/2004 | Takemoto et al. | |
| 6,853,959 B2 | * | 2/2005 | Ikeda et al. | 702/188 |
| 7,263,489 B2 | * | 8/2007 | Cohen et al. | 704/270 |
| 7,383,472 B2 | * | 6/2008 | Miura | 714/42 |
| 7,437,296 B2 | * | 10/2008 | Inoue et al. | 704/275 |
| 7,565,282 B2 | * | 7/2009 | Carus et al. | 704/9 |
| 7,680,658 B2 | * | 3/2010 | Chung et al. | 704/235 |
| 2002/0095295 A1 | * | 7/2002 | Cohen et al. | 704/275 |
| 2004/0181391 A1 | * | 9/2004 | Inoue et al. | 704/10 |
| 2006/0077174 A1 | * | 4/2006 | Chung et al. | 345/156 |
| 2006/0167686 A1 | * | 7/2006 | Kahn | 704/235 |
| 2007/0106506 A1 | * | 5/2007 | Ma et al. | 704/231 |

FOREIGN PATENT DOCUMENTS

| JP | 08-335094 A | 12/1996 |
|---|---|---|
| JP | 2001-056889 A | 2/2001 |

* cited by examiner

*Primary Examiner*—Scott T. Baderman
*Assistant Examiner*—Loan Truong
(74) *Attorney, Agent, or Firm*—Canon U.S.A., Inc. I.P. Division

(57) ABSTRACT

An information processing apparatus detects an error which occurred in a system and stores a system status that the error occurred in association with error information indicating the error. The information processing apparatus outputs guidance information according to a system status, a system status stored in the storage unit, and error information.

4 Claims, 13 Drawing Sheets

FIG. 2

STATUS A (VOICE INPUT)

| TYPE OF ERROR | FREQUENCY OF ERROR |
|---|---|
| spoke-too-soon | 0 |
| too-noisy | 0 |
| no-signal-detected | 0 |

| PARENT STATUS |
|---|
| NONE |

| VOCABULARY WHICH CAN BE SPOKEN |
|---|
| ITEM TO BE SET |

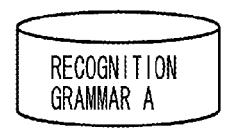
RECOGNITION GRAMMAR A

STATUS A-1 (VOICE INPUT ON PAPER SETTING SCREEN)

| TYPE OF ERROR | FREQUENCY OF ERROR |
|---|---|
| out-of-vocabulary | 1 |

| PARENT STATUS |
|---|
| STATUS A |

| VOCABULARY WHICH CAN BE SPOKEN |
|---|
| PAPER SIZE |

RECOGNITION GRAMMAR A-1

STATUS A-2 (VOICE INPUT ON COPY RATIO SETTING SCREEN)

| TYPE OF ERROR | FREQUENCY OF ERROR |
|---|---|
| out-of-vocabulary | 0 |

| PARENT STATUS |
|---|
| STATUS A |

| VOCABULARY WHICH CAN BE SPOKEN |
|---|
| COPY RATIO |

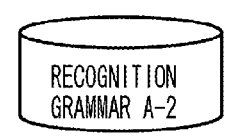
RECOGNITION GRAMMAR A-2

FIG. 3

| TYPE OF ERROR | CONTENT OF GUIDANCE |
|---|---|
| spoke-too-soon | PLEASE SPEAK AFTER THE BEEP. |
| too-noisy | PLEASE SPEAK AFTER CONFIRMING THAT THERE IS NO BACKGROUND NOISE. |
| no-signal-detected | PLEASE SPEAK AFTER CONFIRMING THAT THE MICROPHONE IS WORKING. |
| out-of-vocabulary | PLEASE SAY [VOCABULARY WHICH CAN BE SPOKEN] HERE. |
| ... | ... |

FIG. 7

STATUS B-1 (INPUT ON ALPHABET INPUT SCREEN)

| TYPE OF ERROR | FREQUENCY OF ERROR |
|---|---|
| invalid-button-press | 0 |

| PARENT STATUS |
|---|
| NONE |

| VALID INPUT BUTTON |
|---|
| ALPHABET KEY |

STATUS B-2 (INPUT ON INPUT RESULT CONFIRMATION SCREEN)

| TYPE OF ERROR | FREQUENCY OF ERROR |
|---|---|
| invalid-button-press | 0 |
| press-too-soon | 1 |

| PARENT STATUS |
|---|
| NONE |

| VALID INPUT BUTTON |
|---|
| YES BUTTON OR NO BUTTON |

STATUS B-3 (INPUT ON NUMERAL INPUT SCREEN)

| TYPE OF ERROR | FREQUENCY OF ERROR |
|---|---|
| invalid-value-input | 0 |

| PARENT STATUS |
|---|
| NONE |

| VALID INPUT VALUE |
|---|
| NUMERAL |

FIG. 8

| TYPE OF ERROE | CONTENT OF GUIDANCE |
|---|---|
| invalid-button-press | [VALID INPUT BUTTON] IS VALID HERE. |
| press-too-soon | PLEASE PRESS BUTTON AFTER THE BEEP. |
| invalid-value-input | PLEASE INPUT [VALID INPUT VALUE] HERE. |
| ... | ... |

INFORMATION PROCESSING APPARATUS AND INFORMATION PROCESSING METHOD

BACKGROUND OF THE INVENTION

1. Field of the Invention

The present invention relates to an information processing method which outputs guidance information to a user based on error history.

2. Description of the Related Art

In an information processing apparatus, storing an error which occurs during a user operation, as history information, and using the information to assist user operation is beneficial for a user. For example, Japanese Patent Application Laid-Open No. 08-335094 proposes a user assistance method in which the guidance is updated and changed based on an experience value obtained by totaling the experience in voice input. Furthermore, Japanese Patent Application Laid-Open No. 2001-056889 proposes a method in which a device error caused by a user's error in inputting a setting is detected, and warning information proportional to the learning level of the user making a setting is output based on history information of the detected error.

The related art discussed in Japanese Patent Application Laid-Open No. 08-335094 changes the voice input guidance based on the voice input experience value of a user so that an appropriate guidance can be output to each user at various experience levels. In addition, the related art discussed in Japanese Patent Application Laid-Open No. 2001-056889 gives an intensive warning to a user for an item about which an error in inputting a setting tends to occur. However, while both of the references consider the content of the error, they do not consider the status where the error occurs. Therefore, guidance is not output in accordance with each status to avoid an error which tends to occur in that status.

SUMMARY OF THE INVENTION

The present invention is directed to a method of storing status of an information processing apparatus in which an error occurred in the past and the error information, and outputting guidance based on error history when the apparatus runs into a similar status. As a result, a more appropriate guidance can be output to a user.

According to an aspect of the present invention, an information processing apparatus includes a detection unit configured to detect an error occurring in a system, a storage unit configured to store status information indicating a system status where the detection unit detected an error in association with error information indicating the error, and an output unit configured to output guidance information according to the status information and the error information stored by the storage unit.

According to another aspect of the present invention, an information processing method includes detecting an error occurring in a system, storing status information indicating system status in which an error is detected, in association with error information indicating the error, and outputting guidance information according to the status information and the error information stored in a memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 2 illustrates an example of error history information in an information processing apparatus according to the first exemplary embodiment of the present invention.

FIG. 3 illustrates an example of error history information in an information processing apparatus according to the first exemplary embodiment of the present invention.

FIG. 7 illustrates an example of error history information in an information processing apparatus according to the second exemplary embodiment of the present invention.

FIG. 8 illustrates an example of error history information in an information processing apparatus according to the second exemplary embodiment of the present invention.

DETAILED DESCRIPTION OF THE EMBODIMENTS

Various exemplary embodiments, features, and aspects of the invention will be described in detail below with reference to the drawings.

First Exemplary Embodiment

Figure 1:
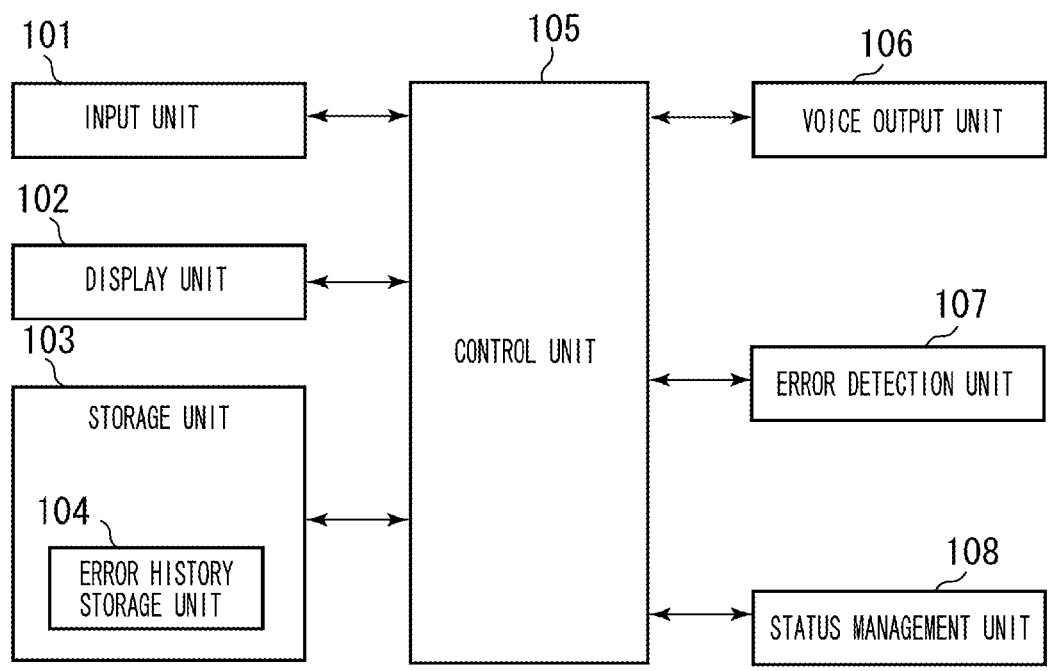
FIG. 1 illustrates a basic configuration of an information processing apparatus according to first and second exemplary embodiments of the present invention.

FIG. 1 illustrates a basic configuration of an information processing apparatus according to a first exemplary embodiment of the present invention. The information processing apparatus includes an input unit 101, a display unit 102, a storage unit 103, an error history storage unit 104, a control unit 105, a voice output unit 106, an error detection unit 107, and a status management unit 108.

The input unit 101 is, for example, a set of buttons, a keyboard, a mouse, a touch panel, a pen, a tablet, a digitizer, a microphone for voice input, an A/D converter, or some combination thereof. The input unit 101 functions as an input interface for inputting various instructions to the apparatus. The display unit 102 is a display device such as a liquid crystal display and displays various types of information in image or in text. A touch panel display device can also be used as the display unit 102. In such a case, the display unit 102 includes the function of the input unit 101 (i.e., to input various instructions into the apparatus). The storage unit 103 is, for example, a hard disk drive (HDD) for storing various types of information, or a storage medium such as a CD-ROM or a DVD-ROM for supplying various types of information to the information processing apparatus. In addition, the HDD or the storage medium stores various application programs, a user interface control program, and various data necessary in executing each program, which are read into the apparatus by the control unit 105 as described later.

The error history storage unit 104 is a storage area for storing the status when an error occurs, in association with the type of error. The error history can be managed in the entire system, or can be managed for each user in the case where a user can be identified. The control unit 105 includes, for example, a work memory, a central processing unit (CPU), and a microprocessor unit (MPU), and performs various processes by reading out programs and data stored in the storage unit 103. The voice output unit 106 is, for example, a speaker or headphones, and outputs voice stored in the storage unit 103 or synthesized voice created according to text. Synthesized voice is formed, for example, using a known voice synthesis technology. Examples of voice output are sound, music, and human voice, but are not limited to these examples. The error detection unit 107 detects an error which occurs in the system and informs the control unit 105. The status management unit 108 manages the status of the system. In the present exemplary embodiment, an application developer predetermines the timing of a transition to a certain status.

FIG. 2 illustrates an example of error history information stored in the error history storage unit 104 in an information processing apparatus according to the first exemplary embodiment. Error information is managed for each status. In the example of FIG. 2, the error information of the three statuses, i.e., 'status A', 'status A-1', and 'status A-2' are managed. 'Status A', 'status A-1', and 'status A-2' are examples of status information indicating the system status.

In the present exemplary embodiment, 'type of error' is predetermined by an application developer, and 'frequency of error' is updated any time the error occurs while an application is running. The 'type of error' does not have to be predetermined and can be added and changed as needed. However, an error unique to 'status A-1' is required to be registered in 'status A-1', and errors common to 'status A-1' and 'status A-2' are registered in the parent status 'status A'. Consequently, in the case where a 'type of error' is to be added as needed, information about the status specific to the error is prepared in advance. In addition, 'frequency of error' can be managed by a number or by probability. 'Parent status', 'vocabulary which can be spoken', and grammar for voice recognition (recognition grammar A, recognition grammar A-1, and recognition grammar A-2) are predetermined by an application developer.

FIG. 3 is an example of a table showing the relation between an error stored in the error history storage unit 104 and a content of guidance in an information processing apparatus in the first exemplary embodiment of the present invention. The relation is predetermined by an application developer. The content of 'vocabulary which can be spoken' shown in FIG. 2 is input into [vocabulary which can be spoken] in FIG. 3. For example, the content of guidance corresponding to 'out-of-vocabulary' in status A-1 is "please say paper size here". Similarly, the content of guidance corresponding to 'out-of-vocabulary' in status A-2 is "please say copy ratio here".

Figure 4:
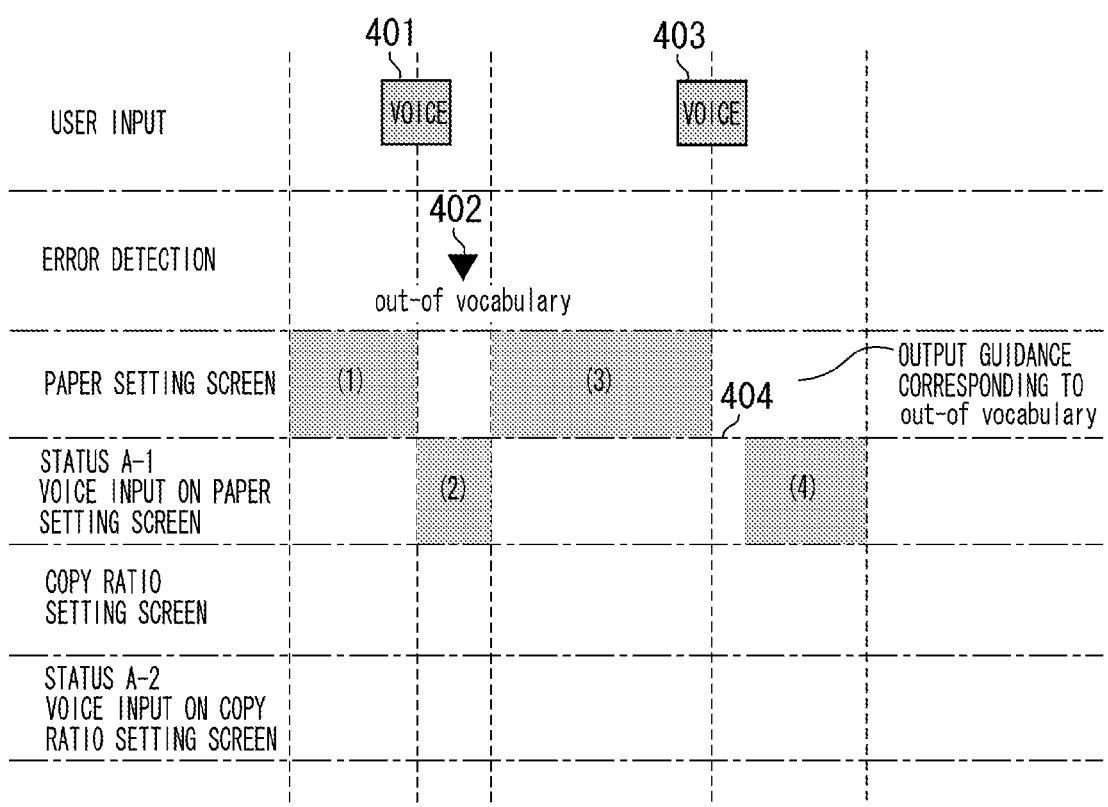
FIG. 4 illustrates an example of an operation in an information processing apparatus according to the first exemplary embodiment of the present invention.
Figure 5:
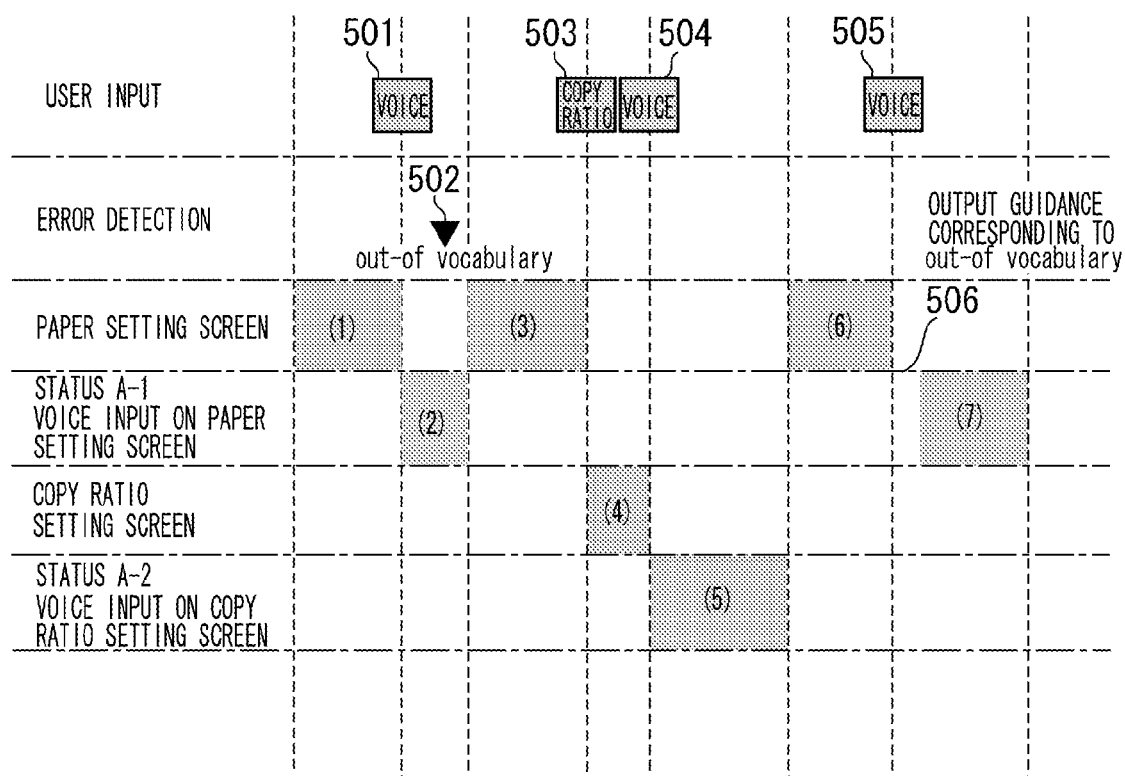
FIG. 5 illustrates an example of an operation in an information processing apparatus according to the first exemplary embodiment of the present invention.
Figure 6:
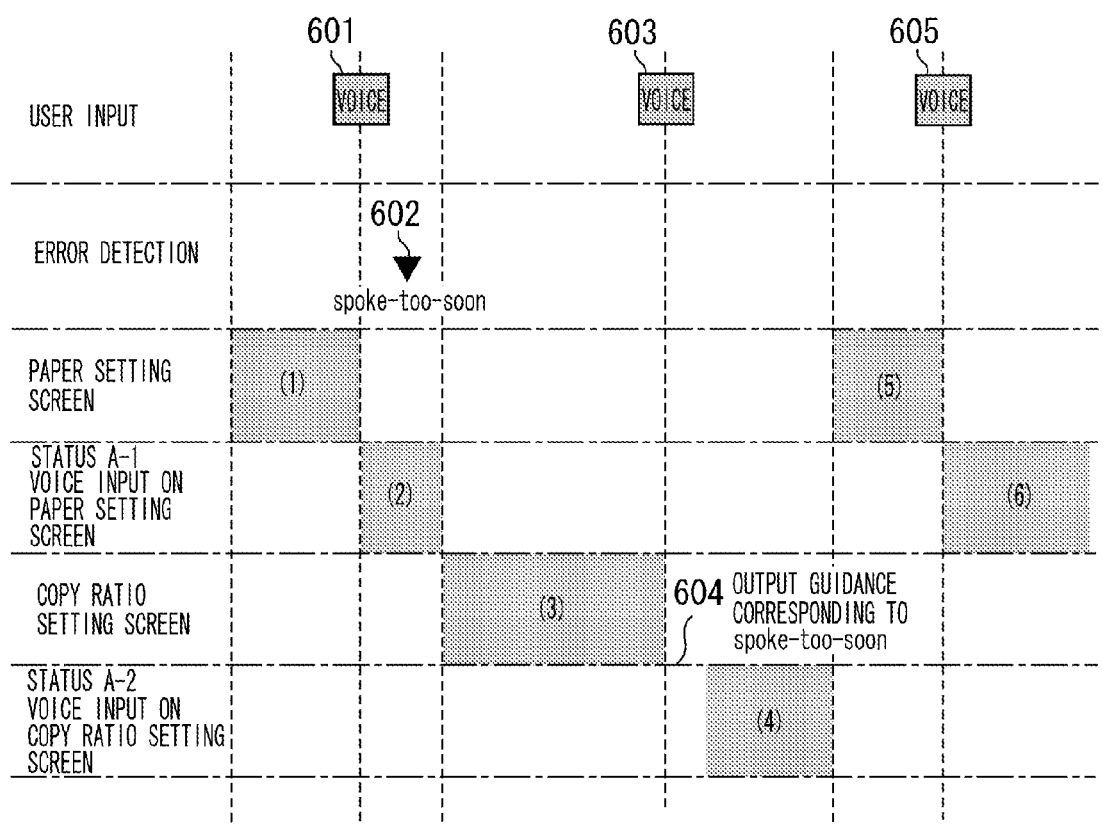
FIG. 6 illustrates an example of an operation in an information processing apparatus according to the first exemplary embodiment of the present invention.

FIGS. 4 to 6 illustrate examples of operations in an information processing apparatus in the first exemplary embodiment. The present exemplary embodiment describes the case where input is made by voice. A user can speak after depressing a 'voice button'.

In FIG. 4, (1) to (4) illustrate a status transition in the information processing apparatus. As described earlier, the status management unit 108 manages the status transition, and an application developer predetermines the timing of a transition to a certain status. When a user presses a 'voice button' (401) on a 'paper setting screen' ((1)), the status makes a transition to 'status A-1' ((2)). In 'status A-1', the user can speak a content described in the recognition grammar A-1. In the case where a user inputs a voice which is not a content described in the recognition grammar A-1 (FIG. 2), the application detects an 'out-of-vocabulary' error (402) and updates error information. To be more specific, the frequency of the 'out-of-vocabulary' error in 'status A-1' is incremented by 1. The status returns from the voice input status ((2)) to the original status ((3)). The user then presses a 'voice button' (403), and the status make a transition to 'status A-1' again ((4)). At this stage, instead of a normal guidance, the guidance corresponding to the 'out-of-vocabulary' error in 'status A-1', i.e., "paper size can be spoken here", is output (404). The guidance is output based on the error information of 'status A-1' (i.e., the frequency of 'out-of-vocabulary' error is 1). The guidance can be output by displaying text or codes on the display unit 102, or by voice on the voice output unit 106.

In FIG. 5, (1) to (7) illustrate a status transition in the information processing apparatus. When a user presses a 'voice button' (501) on a "paper setting screen" ((1)), the status make a transition to 'status A-1' ((2)). In the case where the user inputs a voice which is not a content described in the recognition grammar A-1 (FIG. 2), the application detects an 'out-of-vocabulary' error (502) and updates error information. To be more specific, the frequency of the 'out-of-vocabulary' error in 'status A-1' is incremented by 1. The status then returns from the voice input status (2) to the original status ((3)). The user then presses a 'copy ratio button' (503), and the status make a transition to a 'copy ratio setting screen' ((4)). The user then presses a 'voice button' (504) and the status make a transition to 'status A-2' ((5)). The user can speak a content described in the recognition grammar A-2 in 'status A-2'. Since a corresponding error is not found by referring to error information of 'status A-2' or by referring to error information of the parent status 'status A', a normal guidance is output. The user makes a voice input, and the status makes a transition to a 'paper setting screen' ((6)). The user then presses a 'voice button' (505), and the status makes a transition to 'status A-1' ((7)). At this stage, instead of a normal guidance, a guidance corresponding to an 'out-of-vocabulary' error, i.e., "paper size can be spoken here" is output based on the error information of 'status A-1' (i.e., the frequency of 'out-of-vocabulary' error is 1) (506).

In FIG. 6, (1) to (6) illustrate a status transition of the information processing apparatus. A user presses a 'voice button' on a "paper setting screen" ((1)) (601), and the status makes a transition to 'status A-1' ((2)). In the case where a user starts speaking before pressing the 'voice button' (601), the application detects a 'spoke-too-soon' error (602) and updates error information. To be more specific, since the 'spoke-too-soon' error belongs to the parent status 'status A', the frequency of the 'spoke-too-soon' error in 'status A' is incremented by 1. The user makes a voice input, and the status makes transition to a 'copy ratio setting screen' ((3)). The user then presses a 'voice button' (603) and the status make a transition to 'status A-2' ((4)). Since a corresponding error is not found by referring to the error information of status 'A-2', the error information of the parent status 'status A' is referred to. As a result, instead of a normal guidance, a guidance corresponding to the 'spoke-too-soon' error, i.e., "please speak after the beep" is output based on the error information of 'status A' (i.e., the frequency of 'spoke-too-soon' error is 1) (604). In the case where an error is not detected when a user makes input ((4)), the error information of the present status and the parent status are updated. That is, the frequency of 'spoke-too-soon' error in 'status A' is decremented by 1. The user then makes a voice input, and the status makes a transition to a 'paper setting screen' ((5)). The user then presses a 'voice button' (605), and the status makes a transition to 'status A-1' ((6)). Since a corresponding error is not found by referring to the error information of 'status A-1' or of the parent status 'status A', a normal guidance is output.

There are cases where the status to which an error belongs to and the status where the error is detected, are different, depending on the error type. For example, in FIG. 4, the timing of detecting an 'out-of-vocabulary' error can be after the status makes a transition to "paper setting screen" ((3)). In this case, since the error can be recognized to have occurred while receiving a voice input in 'status A-1', the error is considered to be detected in 'status A-1' ((2)).

Figure 12:
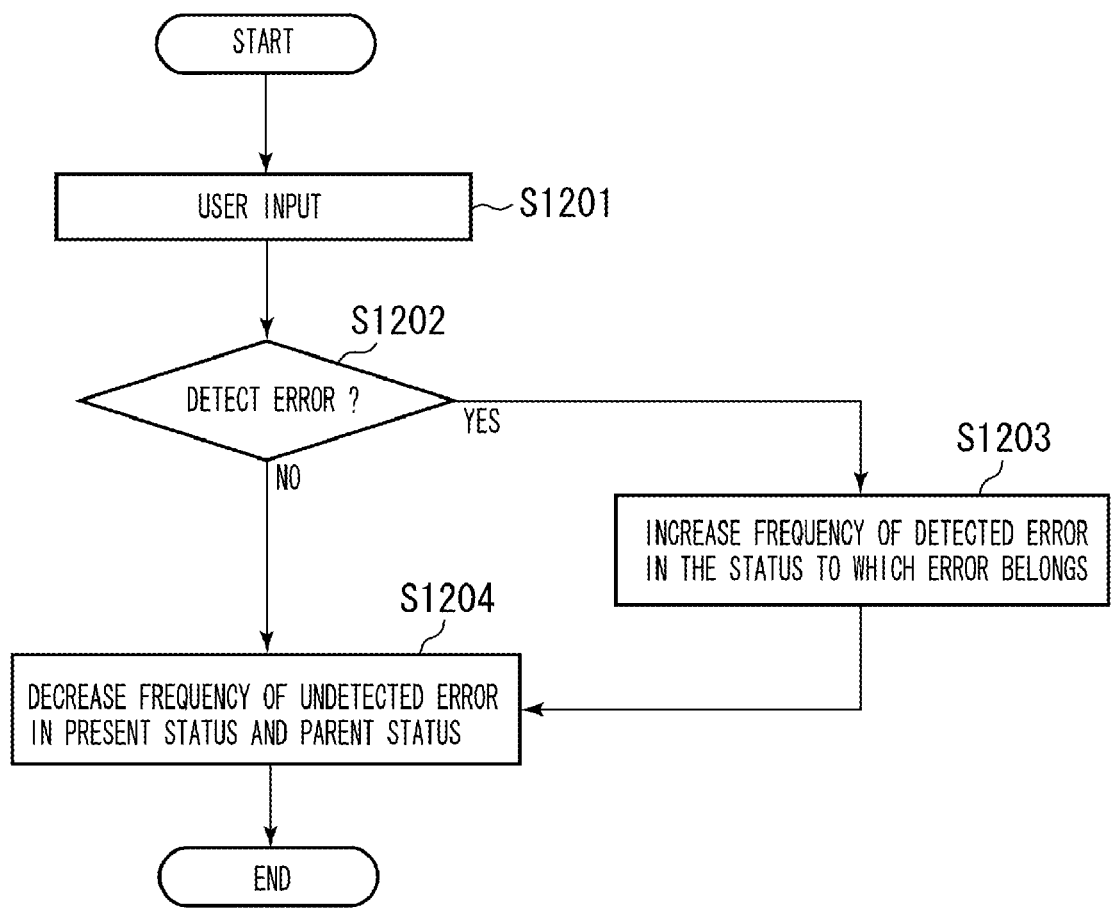
FIG. 12 is a flowchart of a process of updating error information in an information processing apparatus according to the first and second exemplary embodiments of the present invention.

The process of updating error information is described below by referring to the flowchart of FIG. 12. When a user makes an input (step S1201), the error detection unit 107 determines whether an error is detected (step S1202). In the case where an error is not detected (NO in step S1202), the process proceeds to step S1204. In the case where an error is detected (YES in step S1202), the frequency of the detected error is incremented in the status to which the error belongs (step S1203), and the process proceeds to step S1204. The status to which the error belongs can be determined from the error history information stored in the error storage unit 104. That is, the error belonging to the present status is searched and the error belonging to the parent status is searched. When there is a further parent status to the parent status, the process is repeated sequentially. In the example of FIG. 4, when 'out-of-vocabulary' is detected (402), the frequency of 'out-of-vocabulary' error of 'status A-1' is incremented by 1. In the example of FIG. 6, in the case where 'spoke-too-soon' is detected (602), the frequency of the 'spoke-too-soon' error of 'status A' which is the parent status of 'status A-1', is incremented by 1.

In step S1204, the frequency of an error not detected in the present status and the parent status is decremented. That is, among errors belonging to the present status, the frequency of the error which is not detected is decremented, and the same process is performed for the parent status. When there is a further parent status to the parent status, the process is repeated sequentially. For example, in the case where 'out-of-vocabulary' is detected in 'status A-1', the frequency of each of the errors 'spoke-too-soon', 'too-noisy', and 'no-signal-detected' is decremented by 1 (refer to FIG. 2). On the other hand, when 'spoke-too-soon' and 'too-noisy' are detected in 'status A-1', the frequency of each of the errors 'out-of-vocabulary' in 'status A-1' and 'no-signal-detected' in 'status A' is decremented by 1 (refer to FIG. 2). Similarly, in the case where no error is detected, the frequency of all of the errors in the present status and in the parent status is decremented by 1. When there is a further parent status to the parent status, the process is repeated sequentially.

Figure 13:
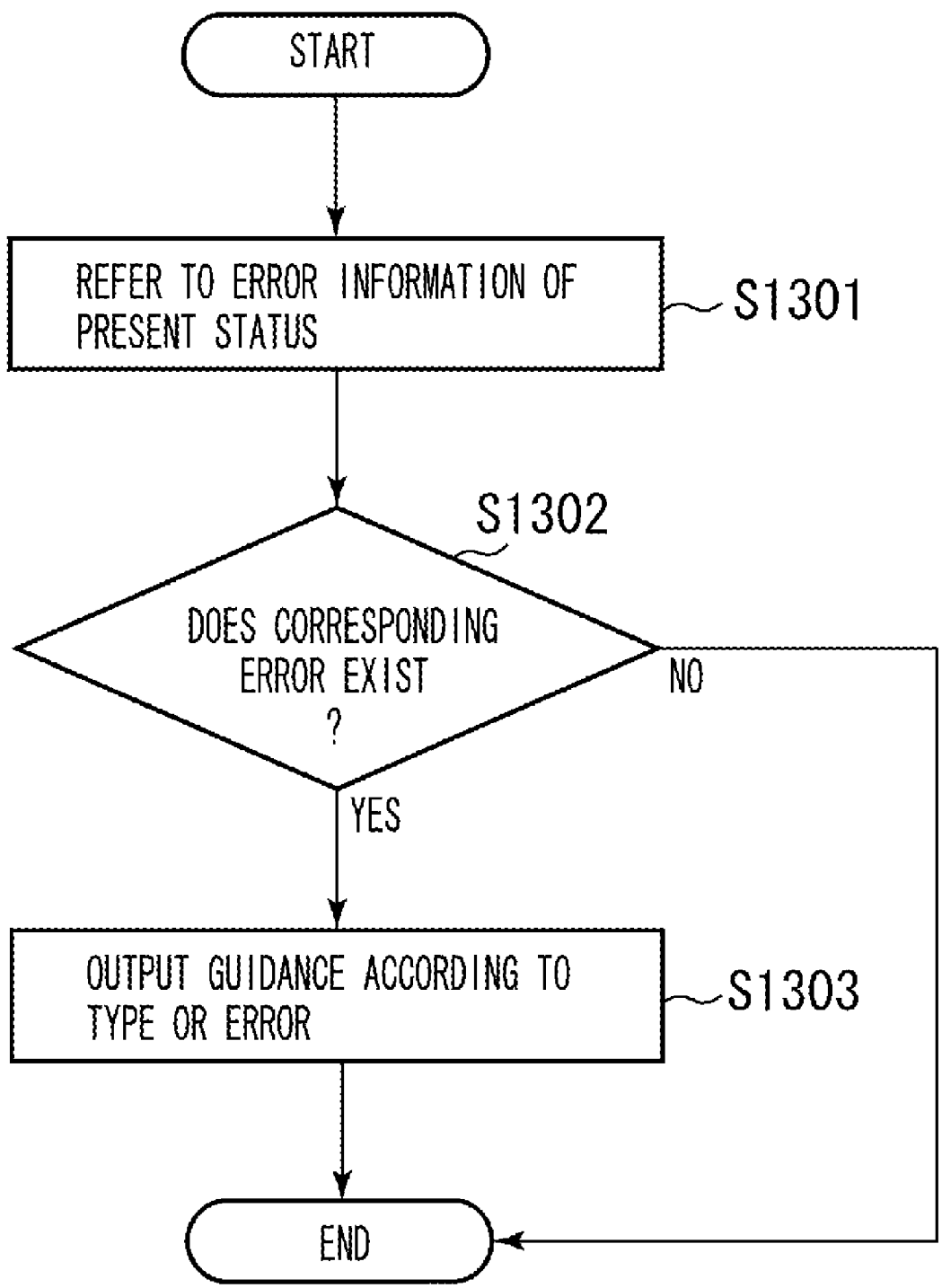
FIG. 13 is a flowchart of a process of moving to a status where a user can enter input in an information processing apparatus according to the first and second exemplary embodiments of the present invention.

The process in which a status moves to where a user can make an input, is described below by referring to FIG. 13. When a status is transferred to where a user can make an input, a reference is made to the error information of the present status (step S1301). In the case where a corresponding error exists (YES in step S302), guidance is output according to the type of error (step S1303). In the case where a corresponding error does not exist (NO in step S1302), the process ends (END). After the process ends, if a parent status exists, the above process is repeated for the parent status. If there is a further parent status to the parent status, the process is repeated sequentially.

The guidance as described above can be output on the display unit 102 in text or codes, or as voice by the voice output unit 106. In the case of voice output, the voice can be previously stored in the storage unit 103, or a synthesized voice based on text can be output. The synthesized voice can be formed using a known voice synthesis technology. In addition, instead of outputting guidance corresponding to an error in place of a normal guidance, normal guidance and guidance corresponding to error can be both output together. Furthermore, in the case where there is a plurality of errors, the guidance corresponding to the error occurring at a highest frequency or to the most recent error can be output. Guidance corresponding to all of the errors can be output in the order of the frequency of error or according to time scale. (When time information is used, the information is stored together in the error history storage unit 104.) The present exemplary embodiment describes error history which is managed for the entire application. However, if a user can be identified, the error history can be managed for each user.

Furthermore, although the above exemplary embodiment describes a configuration in which guidance corresponding to an error is output if the frequency of error is 1, the configuration is not limited to this embodiment. For example, a threshold for a frequency of error can be set to 3 so that guidance can be output only for an error exceeding the threshold. Moreover, in step S1204, the frequency of error which is not detected in the present status and the parent status, is decremented by 1. However, the frequency of error can be decremented in the case where an error is not detected a plurality of times.

As described above, according to the first exemplary embodiment, the status in which an error occurred in the past and the error information are stored. When a user gets into the same status, guidance is output based on the error history, and therefore, user-friendliness is improved.

Second Exemplary Embodiment

The first exemplary embodiment describes an example in which the input unit 101 corresponds to voice input. The second exemplary embodiment describes an example in which the input unit 101 is a graphical user interface (GUI).

FIG. 7 illustrates an example of error history information stored in the error history storage unit 104 in an information processing apparatus according to the second exemplary embodiment. The error history is managed for each status, and in the example of FIG. 7, error information of three statuses, i.e., 'status B-1', 'status B-2', and 'status B-3' is managed. In the present exemplary embodiment, an application developer predetermines 'type of error', and 'frequency of error' is updated any time while the application is executed. Similar to the first exemplary embodiment, the above 'type of error' does not have to be predetermined in the application, and addition can be made as needed. Furthermore, the frequency of error can be managed by a number or by probability. 'Parent status', 'valid input button', and 'valid input value' are predetermined by an application developer.

FIG. 8 illustrates a table of relation between an error and content of guidance stored in the error history storage unit 104 in an information processing apparatus according to the second exemplary embodiment. The relation is predetermined by an application developer. In the figure, the content of 'valid input button' in FIG. 7 is inserted into where [valid input button] is written. For example, the content of guidance corresponding to 'invalid-button-press' in status B-1 is "alphabet key is valid here". Similarly, the content of guidance corresponding to 'invalid-button-press' in status B-2 is "yes button or no button is valid here".

Figure 9:
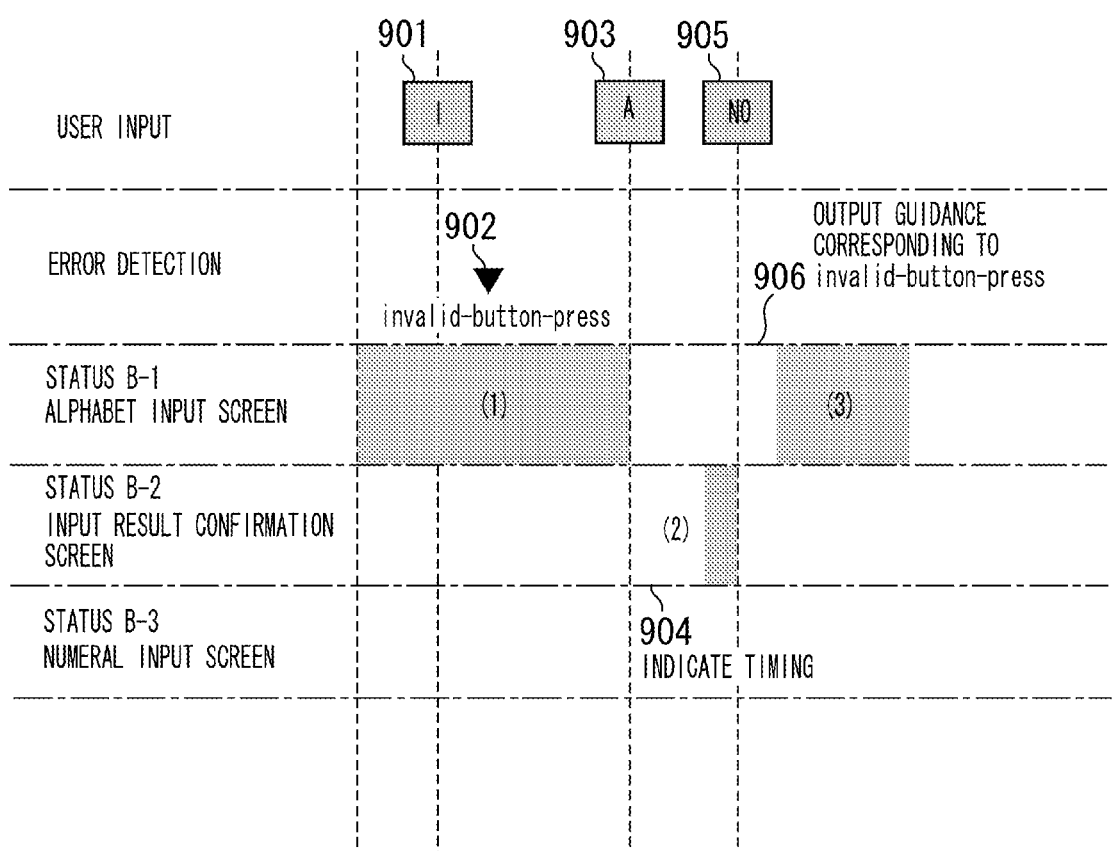
FIG. 9 illustrates an example of an operation in an information processing apparatus according to the second exemplary embodiment of the present invention.
Figure 10:
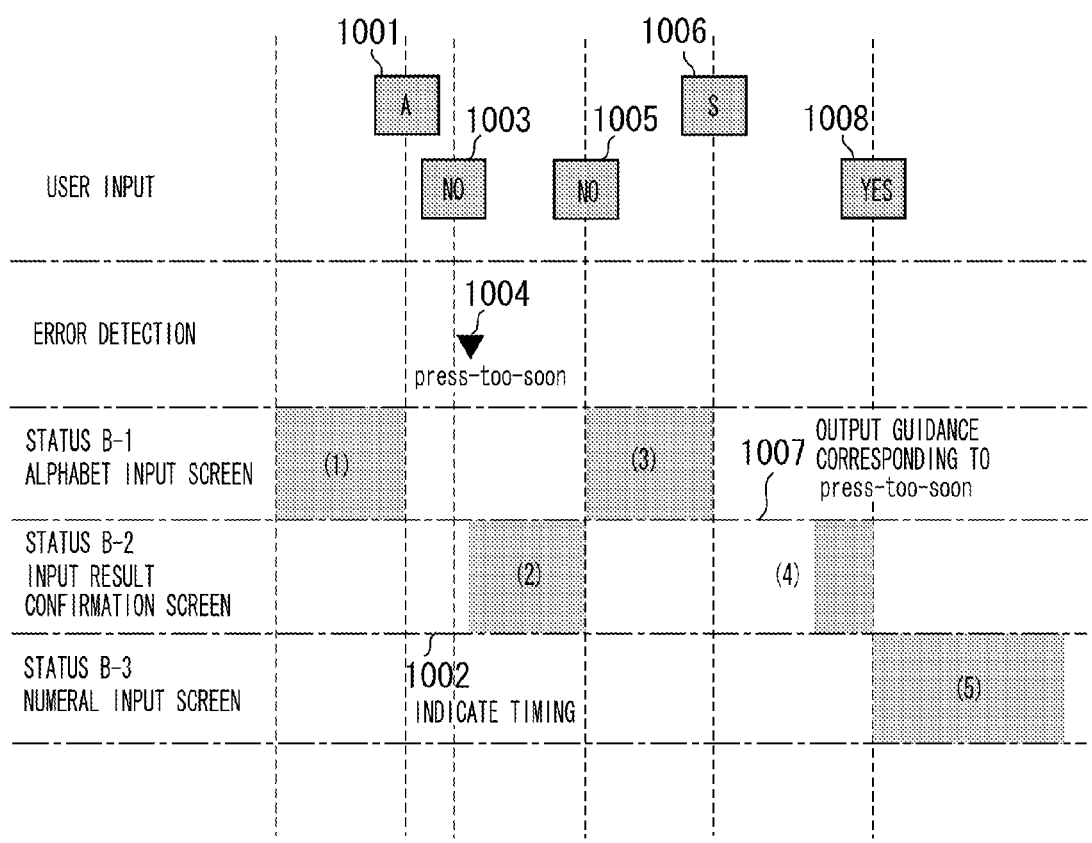
FIG. 10 illustrates an example of an operation in an information processing apparatus according to the second exemplary embodiment of the present invention.
Figure 11:
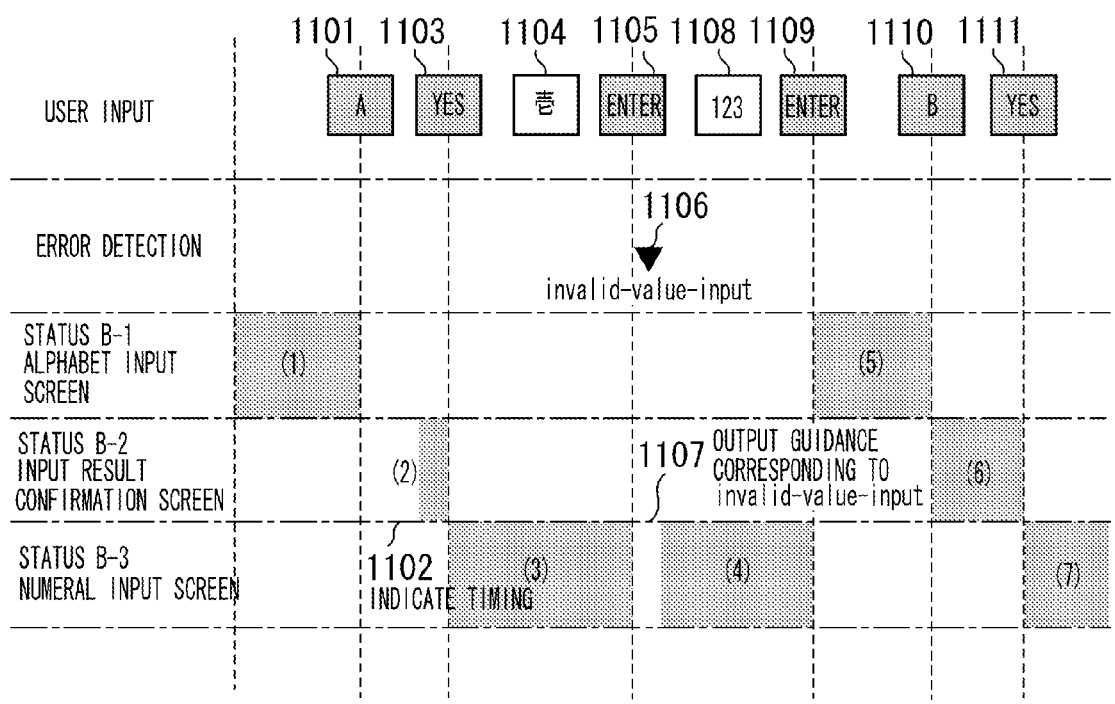
FIG. 11 illustrates an example of an operation in an information processing apparatus according to the second exemplary embodiment of the present invention.

FIGS. 9 to 11 illustrate examples of the operations in an information processing apparatus according to the second exemplary embodiment. The present exemplary embodiment describes a case where an input is made on a GUI. A user can click a button or input text.

In FIG. 9, (1) to (3) illustrate a status transition in an information processing apparatus. As described above, a status transition is managed by the status management unit 108, and an application developer predetermines the timing of a transition to a certain status. In 'status B-1', only the alphabet key is valid. In the case where a user presses a numeral '1 button' in 'status B-1' ((1)) (901), the application detects an 'invalid-button-press' error (902) and updates the error information. To be more specific, the frequency of the 'invalid-button-press' error in 'status B-1' is incremented by 1. The user then presses an alphabet 'A button' (903), and the status makes a transition to 'status B-2' ((2)). Since a corresponding error is not found by referring to the error information of 'status B-2' and there is no parent status, a normal guidance is output. In 'status B-2', input made by the user in 'status B-1' is read out by voice. The user presses a 'yes button' if the voice output is correct, and a 'no button' if the voice output is incorrect after the apparatus indicates the timing of pressing a button (904). If the user presses the 'no button' (905), the status makes a transition to 'status B-1' ((3)). Instead of a normal guidance, the guidance corresponding to 'invalid-button-press' error, i.e., "alphabet key is valid here" is output based on the error information of 'status B-1' (i.e., the frequency of 'invalid-button-press' error is 1) (906). The guidance can be output in text or codes on the display unit 102 or can be output as voice by the voice output unit 106.

In FIG. 10, (1) to (5) illustrate the status transition of an information processing apparatus. If a user presses an alphabet 'A button' in 'status B-1' (1001), the status makes a transition to 'status B-2' ((2)). Since a corresponding error is not found by referring to the error information of 'status B-2' and a parent status does not exist, a normal guidance is output. As described above, the input made by the user input in 'status B-1' is read out by voice. The user presses a 'yes button' if the voice output is correct, and a 'no button' if the voice output is incorrect after the apparatus indicates the timing of pressing the button (1002). In the case where the user presses a 'no button' before the timing of pressing the button (1002) is indicated (1003), the application detects a 'press-too-soon' error (1004) and updates the frequency of error. To be more specific, the frequency of the 'press-too-soon' error in 'status B-2' is incremented by 1. If the user presses the 'no button' again (1005), the status makes a transition to 'status B-1' ((3)). Since there is no corresponding error by referring to the error information of 'status B-1' and a parent status does not exist, the normal guidance is output. The user then presses an alphabet 'S button' (1006), and the status makes a transition to 'status B-2' ((4)). Instead of a normal guidance, a guidance corresponding to the 'press-too-soon' error, i.e., "please press the button after the beep" is output based on the error information of 'status B-2' (i.e., the frequency of the 'press-too-soon' error is 1) (1007). The user then presses the 'yes button' (1008), and the apparatus makes a transition to 'status B-3' ((5)). In the case where an error is not detected when a user makes an input ((4)), the error information of the present status and the parent status is updated. To be more specific, the frequency of the 'press-too-soon' error in 'status B-2' is decremented by 1 (or updated to 0).

In FIG. 11, (1) to (7) illustrate a status transition in an information processing apparatus. If at 'status B-1' ((1)), a user presses an alphabet 'A button' (1101), the apparatus makes a transition to 'status B-2' ((2)). Since a corresponding error is not found by referring to the error information of 'status B-2' and a parent status does not exist, normal guidance is output. As described above, the input made by the user in 'status B-1' is read out by voice. The user presses a 'yes button' if the voice output is correct, and a 'no button' if the voice output is incorrect after the apparatus indicates the timing of pressing the button (1102). If the user presses the 'yes button' (1103), the apparatus makes a transition to 'status B-3' ((3)). 'Status B-3' is a status where a numeral is to be input, and only a numerical input is valid. If a user inputs a Chinese character (1104) and presses the enter button (1105), the application detects an 'invalid-value-input' error (1106) and updates the error information. To be more specific, the frequency of the 'invalid-value-input' error in 'status B-3' is incremented by 1. The status again makes a transition to 'status B-3' ((4)) and the process performed at the time of transition to 'status B-3' is repeated. Instead of normal guidance, guidance corresponding to the 'invalid-value-input' error, i.e., "please input a numeral" is output based on the error information of 'status B-3' (i.e., the frequency of 'invalid-value-input' error is 1) (1107). If the user inputs a numeral (1108) and presses the enter button (1109), the status makes a transition to 'status B-1' ((5)). In the case where an error is not detected when a user makes an input ((4)), the error information of the present status and the parent status is updated. To be more specific, the frequency of the 'invalid-value-input' error of the 'status B-3' is decremented by 1 (or updated to 0). Consequently, a corresponding error is not found by referring to the error information of status B-3 and a parent status does not exist when the status again makes a transition to "status B-3" ((7)), accordingly, normal guidance is output.

As described above, according to the second exemplary embodiment, the status in which an error occurred in the past and the error information is stored. Guidance is output based on the error history when a user reaches the same status, similar to the first exemplary embodiment. As a result, the user-friendliness is improved.

A storage medium which stores software (program code) for realizing the operations of the above-described exemplary embodiments may be provided, to a system or an apparatus so that the computer (CPU or MPU)) of the system or the apparatus can read out and execute programs stored in the storage medium.

In such a case, the software (program code) itself realizes the novel functions of the invention. The storage medium can be, for example, a flexible disk, hard disk, optical disk, magnetic optical disk, CD-ROM, CD-R, magnetic tape, nonvolatile memory card, ROM, or digital versatile disk (DVD).

Furthermore, the above embodiments are not limited to the case where functions according to the above embodiments are realized by executing the program code read by a computer. The present invention includes a case where an OS (operating system) or the like running on the computer performs a part or entire processes in accordance with designations of the program code and realizes functions according to the above embodiments.

Furthermore, the supplied program code can be stored in a memory equipped in a function enhancement board of the computer or a function enhancement unit connected to the computer, and a CPU in the function enhancement board or the function enhancement unit can execute all or part of the processing based on the instructions of the program code to realize the operations of the embodiments.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-120807 filed Apr. 25, 2006, which is hereby incorporated by reference herein in its entirety.

What is claimed is:

1. An information processing apparatus comprising:
a storage unit configured to store, as an error history, a plurality of pieces of information that a type of an error and a type of a status are associated with each other, wherein the error relates to a user operation and had occurred in the past, and wherein the status indicates an operation by which the error had occurred;
a status management unit configured to manage a type of a current status and a type of a current parent status, the current parent status consisting of the current status and a status different from the current status;
a detection unit configured to detect a start of a user operation; and
an information-notifying unit configured to notify a user of guidance information by which the user can recognize that the error occurred in the past in a type of status that is the same as the current status and in a type of status that is the same as the current parent status, based on the error history, in a case where the detection unit detects the start of the user operation.

2. The information processing apparatus according to claim 1, wherein in the case where the detection unit detects a start of voice input as the start of the user operation, the information-notifying unit notifies the user of at least any one of guidance for warning the user of a timing of the start of voice input, guidance for warning the user of background noise, guidance for warning the user of an operation of a microphone, and guidance for warning the user of vocabulary to be subjected to voice recognition, based on the error history, as the guidance information.

3. An information processing method comprising:
storing, as an error history, a plurality of pieces of information that a type of an error and a type of a status are associated with each other, wherein the error relates to a user operation and had occurred in the past, and wherein the status indicates an operation by which the error had occurred;
managing a type of a current status and a type of a current parent status, the current parent status consisting of the current status and a status different from the current status;
detecting a start of a user operation; and
notifying a user of guidance information by which the user can recognize that the error occurred in the past in a type of status that is the same as the current status and in a type of status that is the same as the current parent status, based on the error history, in a case where the start of the user operation is detected.

4. A computer-readable storage medium storing a program for causing a computer to execute the information processing method according to claim 3.

* * * * *